(12) United States Patent
Tan et al.

(10) Patent No.: US 11,106,179 B2
(45) Date of Patent: Aug. 31, 2021

(54) HOLOGRAPHIC DISPLAY PANEL, HOLOGRAPHIC DISPLAY DEVICE AND DISPLAY METHOD THEREFOR

(71) Applicant: BOE TECHNOLOGY GROUP CO., LTD., Beijing (CN)

(72) Inventors: Jifeng Tan, Beijing (CN); Xue Dong, Beijing (CN); Xiaochuan Chen, Beijing (CN); Wei Wang, Beijing (CN); Xin Gu, Beijing (CN); Feng Guan, Beijing (CN); Meili Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 507 days.

(21) Appl. No.: 15/746,766

(22) PCT Filed: Jul. 18, 2017

(86) PCT No.: PCT/CN2017/093392
§ 371 (c)(1),
(2) Date: Jan. 22, 2018

(87) PCT Pub. No.: WO2018/045827
PCT Pub. Date: Mar. 15, 2018

(65) Prior Publication Data
US 2019/0011881 A1    Jan. 10, 2019

(30) Foreign Application Priority Data

Sep. 9, 2016  (CN) .......................... 201610815306.1

(51) Int. Cl.
*G02B 5/18*   (2006.01)
*G03H 1/08*   (2006.01)
(Continued)

(52) U.S. Cl.
CPC ............. *G03H 1/08* (2013.01); *G02B 5/1842* (2013.01); *G02B 5/201* (2013.01);
(Continued)

(58) Field of Classification Search
CPC .. H04N 13/305; H04N 13/361; H04N 13/324; H04N 13/312; H04N 13/302;
(Continued)

(56) References Cited

U.S. PATENT DOCUMENTS 5,119,214 A  *  6/1992  Nishii ...................... G03H 1/02
                                                       359/7
2009/0015764 A1*  1/2009  Su ......................... G02F 1/1393
                                                       349/106
(Continued)

FOREIGN PATENT DOCUMENTS

CN     101750748 A     6/2010
CN     102033413 A     4/2011
(Continued)

OTHER PUBLICATIONS

International Search Report and Written Opinion dated Sep. 27, 2017, for corresponding PCT Application No. PCT/CN2017/093392.

*Primary Examiner* — Audrey Y Chang
(74) *Attorney, Agent, or Firm* — Kinney & Lange, P.A.

(57) ABSTRACT

A holographic display panel comprises a plurality of display units, each display unit comprises at least two adjacent pixels, each pixel comprises: a plurality of sub-pixels; and a plurality of phase plates. Diffractive angles of light coming out of the phase plates corresponding to the sub-pixels in a same pixel are the same, a diffractive angle of first light coming out of the phase plates corresponding to a first pixel in one of the display units is different from a diffractive angle of second light coming out of the phase plates corresponding (Continued)

to a second pixel that is different from the first pixel but in the same display unit, and a reverse extension line of the first light and a reverse extension line of the second light intersect at an image plane position.

16 Claims, 7 Drawing Sheets

(51) Int. Cl.
    *H04N 13/324*     (2018.01)
    *H04N 13/312*     (2018.01)
    *G03H 1/22*     (2006.01)
    *G02B 5/20*     (2006.01)
    *G02B 27/42*     (2006.01)
    *G02B 30/27*     (2020.01)
    *G02F 1/13*     (2006.01)
    *G03H 1/02*     (2006.01)
    *H04N 13/302*     (2018.01)

(52) U.S. Cl.
CPC ......... *G02B 27/4272* (2013.01); *G02B 30/27* (2020.01); *G02F 1/13* (2013.01); *G03H 1/2294* (2013.01); *H04N 13/312* (2018.05); *H04N 13/324* (2018.05); *G03H 2001/0224* (2013.01); *G03H 2210/30* (2013.01); *G03H 2225/23* (2013.01); *G03H 2225/35* (2013.01); *G03H 2225/55* (2013.01); *H04N 13/302* (2018.05)

(58) Field of Classification Search
CPC ....... G02F 1/1393; G02F 1/1335; G03H 1/02; G03H 2001/0224; G03H 2225/55; G02B 30/27; G02B 30/31; G02B 27/4272; G02B 5/1842
USPC ......... 359/7, 15, 452, 462, 569, 464; 349/33
See application file for complete search history.

(56) References Cited

U.S. PATENT DOCUMENTS

| 2009/0180180 A1* | 7/2009 | Shimshi ............... H04N 13/361 359/462 |
|---|---|---|
| 2010/0085628 A1* | 4/2010 | Lee .......................... G02F 1/167 359/296 |
| 2012/0013651 A1 | 1/2012 | Trayner et al. |
| 2012/0200795 A1* | 8/2012 | Takatori ................. G02B 30/27 349/33 |
| 2013/0033752 A1* | 2/2013 | Chen .................... H04N 13/302 359/569 |
| 2014/0111856 A1 | 4/2014 | Brug et al. |
| 2015/0261000 A1* | 9/2015 | Ohbitsu ............... H04N 13/305 348/59 |
| 2017/0139307 A1 | 5/2017 | Yoon |

FOREIGN PATENT DOCUMENTS

| CN | 102282856 A | 12/2011 |
|---|---|---|
| CN | 103635850 A | 3/2014 |
| CN | 106154797 A | 11/2016 |
| CN | 206002848 U | 3/2017 |
| EP | 2482117 A1 | 8/2012 |
| WO | 20151999295 A1 | 12/2015 |

\* cited by examiner

HOLOGRAPHIC DISPLAY PANEL, HOLOGRAPHIC DISPLAY DEVICE AND DISPLAY METHOD THEREFOR

CROSS REFERENCE TO RELATED APPLICATIONS

This application is a Section 371 National Stage Application of International Application No. PCT/CN2017/093392, filed on 18 Jul. 2017, entitled "HOLOGRAPHIC DISPLAY PANEL, HOLOGRAPHIC DISPLAY DEVICE AND DISPLAYING METHOD THEREFOR", which claims priority to Chinese Application No. 201610815306.1, filed on 9 Sep. 2016, incorporated herein by reference in its entirety.

TECHNICAL FIELD

The present disclosure relates to the field of display technologies, and particularly, to a holographic display panel, a holographic display device having the holographic display panel and a holographic display method for the holographic display device.

BACKGROUND

With continuous development of display technologies, three-dimensional (3D) display technologies have been more and more widely used. During the process of realizing a 3D display, the left eye and the right eye of a user can receive different images, and the two images may constitute a pair of stereoscopic images having a horizontal parallax, and with image fusion effect of the brain, a stereoscopic image having a certain depth of field is finally formed. However, since the images received by the left eye and the right eye of the user are different from each other, the user may easily feel dizzy after watching a 3D display image for a long time.

SUMMARY

An object of the present disclosure is to provide a holographic display panel, a holographic display device and a display method therefor, to overcome or alleviate at least one aspect of the disadvantages mentioned above.

According to one aspect of the present disclosure, there is provided a holographic display panel.

According to an exemplary embodiment, the holographic display panel comprises a plurality of display units, and each of the plurality of display units comprises at least two adjacent pixels each comprising a plurality of sub-pixels. Each of the plurality of display units further comprises a plurality of phase plates, each sub-pixel of the plurality of sub-pixels corresponding to one of the plurality of phase plates in a light exit direction of the each sub-pixel, the plurality of phase plates being configured to control diffractive angles of light coming out of the plurality of phase plates. Diffractive angles of light coming out of the phase plates corresponding to the sub-pixels in one same pixel are the same, a diffractive angle of first light coming out of the phase plates corresponding to a first pixel in one of the plurality of display units is different from a diffractive angle of second light coming out of the phase plates corresponding to a second pixel that is different from the first pixel and is in the same display unit as the first pixel, and a reverse extension line of the first light and a reverse extension line of the second light intersect at an image plane position.

According to another exemplary embodiment, the plurality of display units may be divided into a plurality of display groups arranged into an array, each of the plurality of display groups is consisted of at least two display units, and the at least two display units are located adjacent to each other. Image plane positions of the display units in a same one of the plurality of display group are different from each other.

According to another exemplary embodiment, one display unit of the plurality of display units may have an image plane position different from an image plane position of any one of display units adjacent to the one display unit.

According to another exemplary embodiment, each pixel may comprise a first sub-pixel, a second sub-pixel and a third sub-pixel. First sub-pixels, second sub-pixels and third sub-pixels in the holographic display panel are arranged in two adjacent rows. The first sub-pixels and the second sub-pixels are arranged alternately in one row of the two adjacent rows, and the other row of the two adjacent rows is constituted only by the third sub-pixels. The third sub-pixel of each pixel is located between the first sub-pixel and the second sub-pixel of the same pixel in a direction of the row.

According to another exemplary embodiment, the sub-pixels of each pixel may be arranged in a same row.

According to another exemplary embodiment, the plurality of phase plates may be transmission gratings.

According to another exemplary embodiment, the holographic display panel may further comprise an array substrate and a color filter substrate disposed opposite to the array substrate. The color filter substrate comprises a color filter layer and the plurality of phase plates, and the plurality of phase plates are disposed at a side of the color filter layer close to or facing away from the array substrate.

According to another aspect of the present disclosure, there is provided a holographic display device.

According to an exemplary embodiment, the holographic display device may comprise the holographic display panel according to any one of the above embodiments.

According to another exemplary embodiment, the holographic display panel may comprise a liquid crystal display panel and a collimated backlight source configured to provide backlight to the liquid crystal display panel.

According to a further aspect of the present disclosure, there is provided a holographic display method.

According to an exemplary embodiment, the holographic display method may be used for the holographic display device according to any one of the above embodiments. The holographic display method may comprise obtaining coded information of a holographic image. The coded information comprises a gray scale value of each pixel in each feature area of the image, and the gray scale value is superimposed with image plane position data of the feature area. The image plane position data of one feature area indicates only one image plane position. The holographic display method further comprises: converting the gray scale value of each pixel into voltage data of each sub-pixel in the pixel; and charging each sub-pixel in the pixel in accordance with the voltage data during progressively scanning rows of sub-pixels.

According to another exemplary embodiment, the plurality of display units are divided into a plurality of display groups arranged into an array, each of the plurality of display groups is consisted of at least two display units having different image plane positions, each of the plurality of display units comprising at least two adjacent pixels, an image plane position indicated by image plane position data of the feature area is different from an image plane position of any of the plurality of display units. The method of superimposing an image plane position of the feature area to obtain the gray scale value of each pixel in the feature area comprises: selecting and turning on one pixel of each display unit of the at least two different display units, wherein reverse extension lines of light coming out of the phase plates corresponding to the pixels that are turned on intersect at an image plane position indicated by the image plane position data of the feature area.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EMBODIMENTS

Figure 1A:
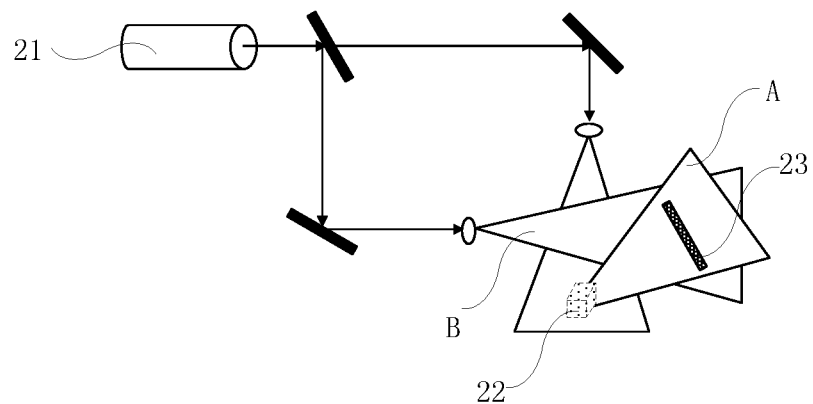
FIG. 1a is an illustrative drawing showing a process of recording a holographic image.

Exemplary embodiments of the present disclosure will be described hereinafter in detail with reference to the attached drawings, wherein the like reference numerals refer to the like elements. The present disclosure may, however, be embodied in many different forms and should not be construed as being limited by the embodiment set forth herein; rather, these embodiments are provided so that the present disclosure will be thorough and complete, and will fully convey the concept of the disclosure to those skilled in the art.

In order to solve the problems mentioned in the background part of the present disclosure, there exists a holographic display technology, which can make images received by left eye and right eye of a user consistent with each other. A specific process of such holographic display is briefly introduced as follows.

Figure 1B:
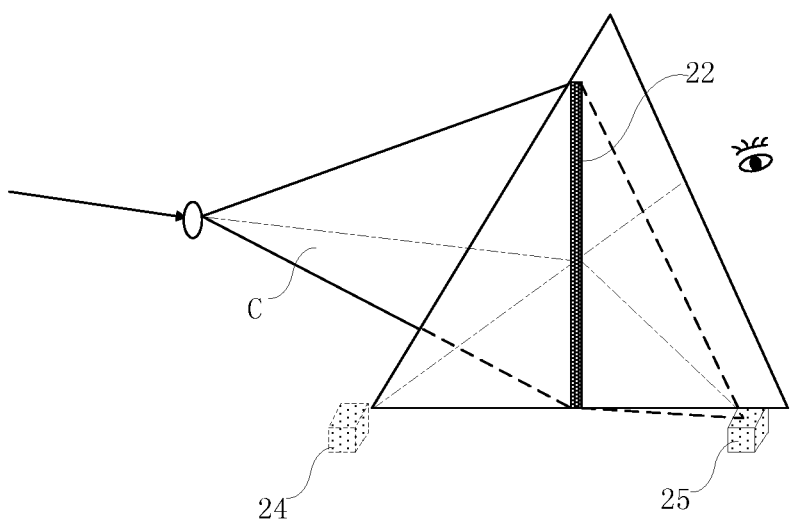
FIG. 1b is an illustrative drawing showing a process of reproducing the holographic image shown in FIG. 1a and recorded on a holographic plate.

As shown in FIG. 1, light emitted by a laser 21 is divided into two beams, one of the beams irradiates to an object 22 and is reflected and scattered on a surface of the object 22, reflected light and scattered light from the surface of the object 22 arrive at a holographic plate 23 and then form an object light wave A. The other light beam, used as a reference light wave B, irradiates to the holographic plate 23 and exposes the holographic plate 23, so that the holographic plate obtains an interference image having all information of the object light wave A, such as amplitude and phase, is recorded. Then, as shown in FIG. 1b, a reproducing light wave C (which is the same as the above-mentioned reference light wave B) is used to irradiate the holographic plate 23 on which all information of the object light wave is recorded, such that the original object light wave A can be reproduced, thereby a vivid stereoscopic virtual image 24 is displayed. When the reproducing light wave C is the same as a conjugate light wave of the reference light wave B, a real image 25 of the object 22 can be obtained, and usually in the holographic display technology, what a user sees is the above-mentioned virtual image 24.

The holographic plate 23 is provided thereon with a photosensitive material, therefore during the process of exposing the holographic plate by the reference light wave B, all information of the object light wave A can be recorded. However, since the amplitude and phase recorded on the exposed holographic plate 23 cannot be changed, only one stereoscopic image can be displayed. Based on that, even if a superposition exposure is performed on the holographic plate 23, the number of formed interference images is limited, thus a dynamic holographic display cannot be achieved, and user experience on the holographic display is getting worse.

Figure 2:
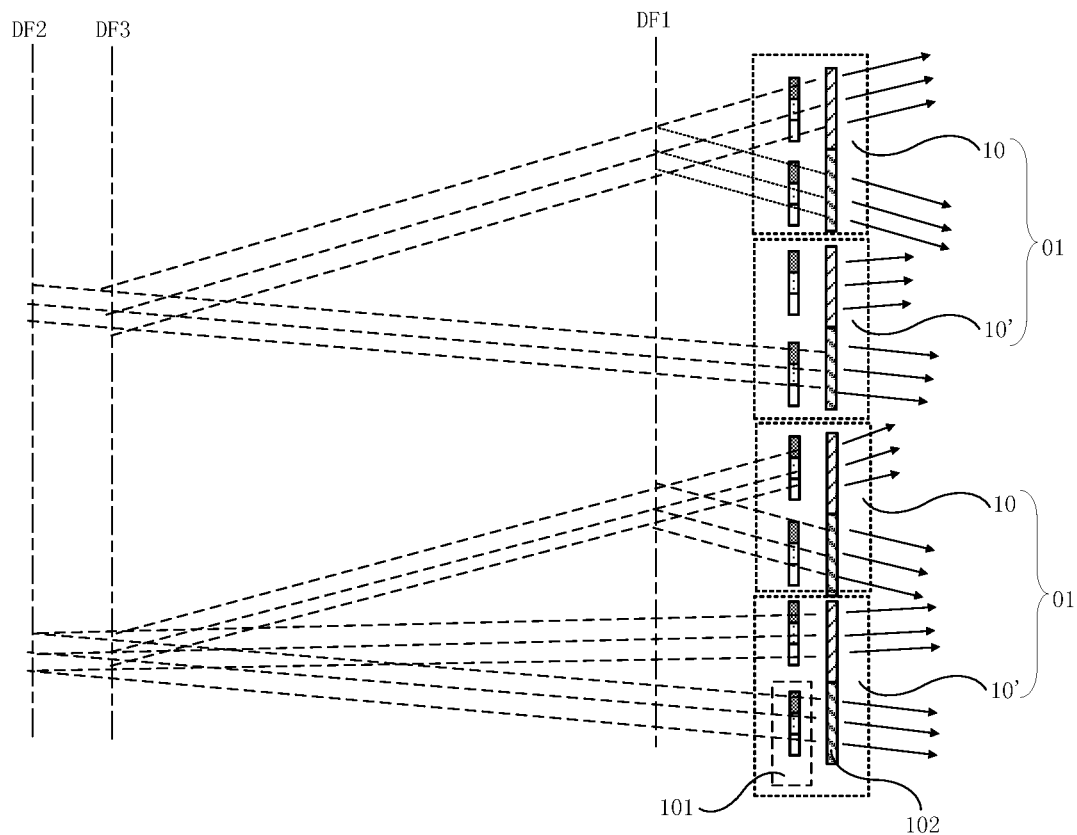
FIG. 2 is an illustrative drawing showing a working principle of a holographic display panel according to an embodiment of the present disclosure, and schematically showing reproducing of the holographic image and setting an image plane position of the reproduced image.

FIG. 2 shows a holographic display panel according to an embodiment of the present disclosure. The holographic display panel comprises a plurality of display units 10, each display unit 10 comprises at least two adjacent pixels 101, and each pixel 101 comprises a plurality of sub-pixels 1011, as shown in FIG. 3.

Type and number of sub-pixels 1011 in one pixel 101 may vary as desired. For example, one pixel 101 may include three sub-pixels 1011, which may be a red sub-pixel, a green sub-pixel and a blue sub-pixel respectively, or which may be a magenta sub-pixel, a cyan sub-pixel and a yellow sub-pixel. In another example, in addition to the red sub-pixel, the green sub-pixel and the blue sub-pixel, the pixel 101 may also include a white sub-pixel or a yellow sub-pixel.

Before display, encoded information of a holographic image obtained through hologram calculation may be converted into voltage data applied to each sub-pixel of a pixel. When the holographic image changes, the encoded information changes as well, and the voltage data applied to each sub-pixel changes as well, such that a dynamic holographic display can be achieved.

Figure 3:
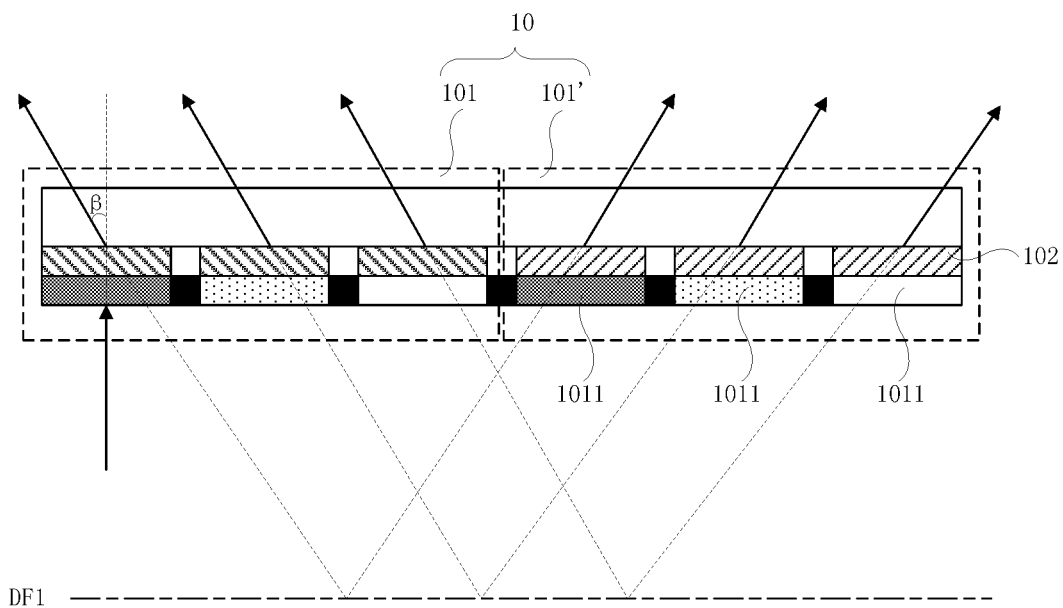
FIG. 3 is an illustrative drawing showing a display unit according to an embodiment of the present disclosure and showing that reverse extension lines of light exiting from phase plates of different pixels intersect at an image plane position.

As shown in FIG. 3, each display unit 10 further includes a plurality of phase plates 102, and each sub-pixel 1011 is aligned with one of the phase plates 102 along its light outcoming direction. The phase plates 102 are used to control diffractive angles β of light exiting from the phase plates 102. A diffractive angle β is an included angle between a direction of light coming out of the phase plate 102 and a direction of incident light to the phase plate 102.

Light passing through phase plates 102 corresponding to sub-pixels 1011 of a same pixel 101 has a same diffractive angle β, and light passing through phase plates 102 corresponding to one pixel 101 of a display unit 10 has a different diffractive angle β from that of light passing through phase plates 102 corresponding to another pixel 101 of the same display unit 10.

According to the embodiment shown in FIG. 3, light emitted from sub-pixels 1011 of one pixel 101 (for example, the left pixel 101) has the same diffractive angle after passing through phase plates 102 corresponding to the sub-pixels 1011 respectively. Meanwhile, light emitted from sub-pixels 1011 of the right pixel 101' also has the same diffractive angle after passing through phase plates 102 corresponding to the sub-pixels 1011 respectively. However, in a same display unit 10, light emitted from the left pixel 101 is deflected leftward after passing through the phase plates 102, while light emitted from the right pixel 101 is deflected rightward after passing through the phase plates 102. Therefore, reverse extension lines of light emitted from the same display unit 10 intersect at an image plane position DF1.

To be noted, since the phase plates 102 are used to diffract incident light, phase gratings (i.e., diffraction grating) can be used as the phase plates 102, and preferably, in order to improve utilization of light, transmission gratings may be used as the phase plates 102. Because a phase of light at a convex portion of the transmission grating is different from a phase of the light at a concave portion of the transmission grating, the light can be diffracted when passing through the transmission grating.

Figure 4A:
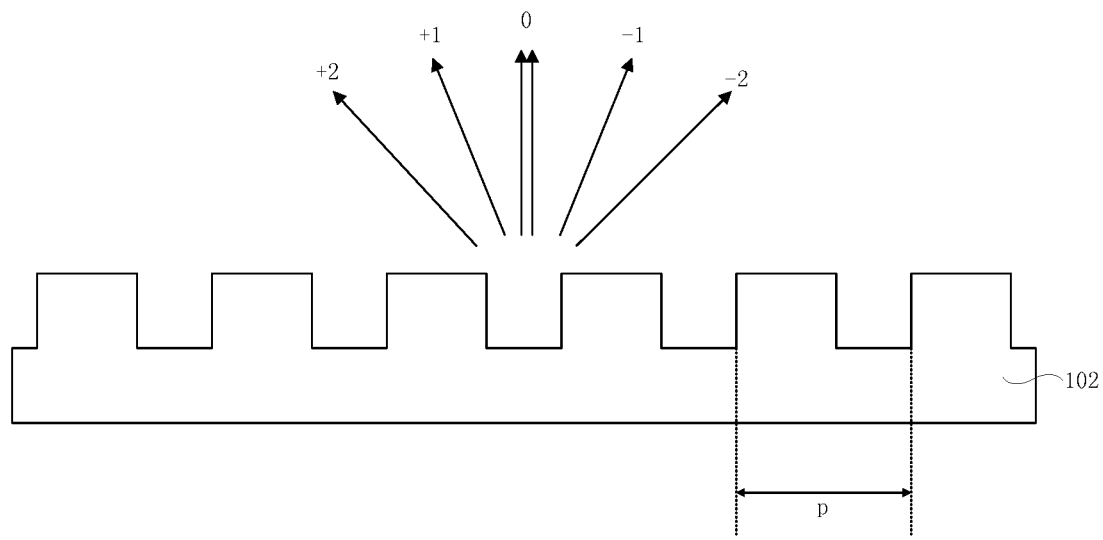
FIG. 4a shows an embodiment of the phase plate of the present disclosure, wherein the phase plate is a single-order grating, and FIG. 4a further illustratively shows a diffraction process of light passing through the phase plate.
Figure 4B:
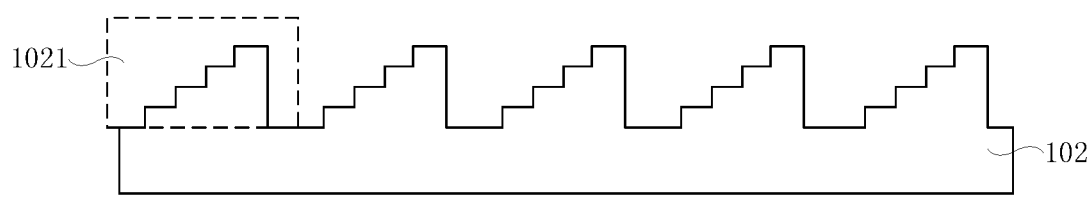
FIG. 4b shows another embodiment of the phase plate of the present disclosure, wherein the phase plate is a multi-order grating.

The transmission grating may be a single order grating shown in FIG. 4a or a multi-order grating shown in FIG. 4b. A diffractive angle β of m-order diffracted wave of the transmission grating is only determined by a period P of the grating, the wavelength λ of an incident wave and an incident angle β0, i.e., $\sin β - \sin β0 = mπ/P$ ($m=0, ±1, ±2, \ldots$), thus, in a case that incident wave has a constant wavelength λ, the diffractive angle β may be adjusted through adjusting the period P of the transmission grating.

Figure 5:
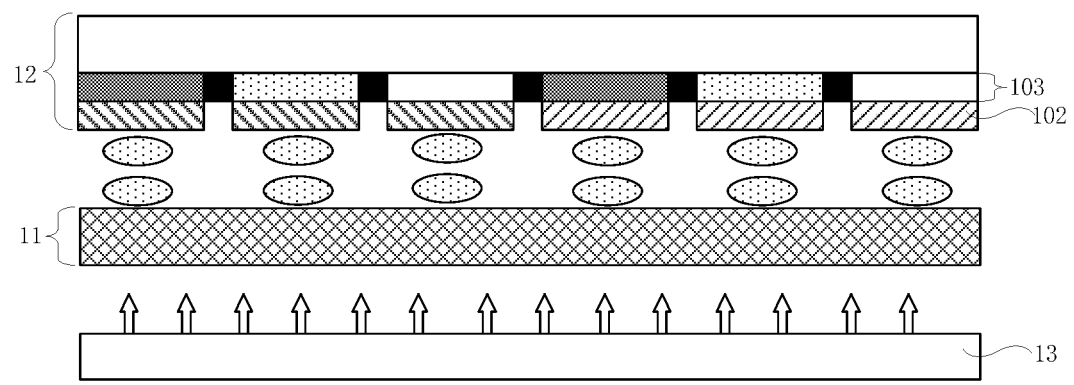
FIG. 5 is an illustrative drawing showing a holographic display device according to an embodiment of the present disclosure.

FIG. 5 shows an embodiment of the holographic display panel. As shown in FIG. 5, the holographic display panel comprises an array substrate 11 and an opposite substrate 12 that are arranged opposite to each other, the opposite substrate 12 may include a color filter layer 103 and the above-described phase plates 102. The phase plates 102 are arranged at a side of the color filter layer 103 close to the array substrate 11, and light emitted from a backlight source 13 is diffracted by the phase plates 102 first and then passes through the color filter layer 103. In this case, wavelengths λ of incident light to the phase plates 102 are the same. In order that a diffractive angle of light emitted from one pixel 101 of a display unit 10 after passing through the phase plate 102 corresponding to the one pixel 101 is different from a diffractive angle of light emitted from another or other pixels 101 in the same display unit after passing through the phase plate 102 corresponding to the another or other pixels, periods (P) of the phase plates 102 corresponding to different pixels 101 in the same display unit 10 may be adjusted, such that the period of the phase plates 102 corresponding to one pixel 101 is different from that of the phase plates 102 corresponding to another or other pixels 101.

Figure 6:
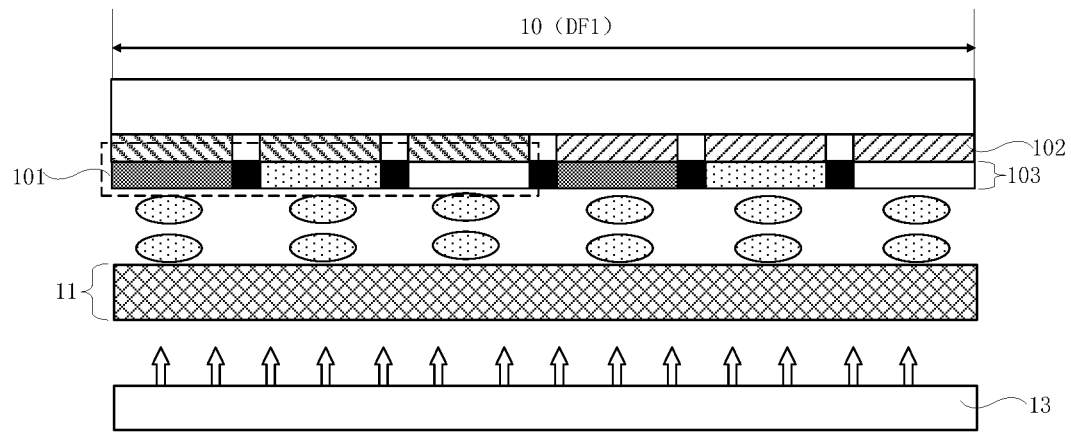
FIG. 6 is an illustrative drawing showing a holographic display device according to another embodiment of the present disclosure.

FIG. 6 shows another embodiment of the holographic display panel. As shown in FIG. 6, the structure shown in FIG. 6 differs from the structure shown in FIG. 5 in that the phase plates 102 are arranged at a side of the color filter layer 103 facing away from the array substrate 11. Light emitted from the backlight source 13 first passes through the color filter layer 103 and then arrives at the phase plates. With a light filtering effect of the color filter layer 103, light of different colors irradiates different phase plates 102. For example, in a condition of the pixel 101 including a red sub-pixel, a green sub-pixel and a blue sub-pixel, the pixel 101 can emit red light, green light and blue light. Since wavelengths λ of the red light, the green light and the blue light are different from each other, wavelengths λ of incident light arrives at the phase plates 102 are different from each other. In order to make the light emitted by three sub-pixels 1011 in a same pixel 101 (such as the left pixel 101) to have a same diffractive angle β after passing through their respective phase plates 102, periods P of the three phase plates 102 corresponding to the three sub-pixels 1011 need to be changed, such that the periods of the three phase plates 102 are different from each other. For example, when a diffractive angle β of green light after passing through the phase plates 102 is used as a reference, periods of phase plates 102 corresponding to red sub-pixels need to be increased and periods of the phase plates 102 corresponding to the blue sub-pixels simultaneously, because wavelength λ of red light is longer than those of green light and blue light.

In summary, because there is a relationship $λr>λg>λb$ among wavelength λr of red light, wavelength λg of green light and wavelength λb of blue light, there is a relationship $Pr>Pg>Pb$ existing among the period Pr of the phase plate 102 corresponding to the red sub-pixel, the period Pg of the phase plate 102 corresponding to the green sub-pixel and the period Pb of the phase plate 102 corresponding to the blue sub-pixel. Therefore, periods P of the phase plates 102 in the same display unit 10 of FIG. 6 are different from each other.

Additionally, when the phase plates 102 are transmission gratings, it can generate diffracted waves of m orders. For example, as shown in FIG. 4a, the phase plate is a single-order grating, and it generates diffracted waves of 2 orders (m=2). Because 0-order diffracted wave is in a direction of the incident light, its diffractive angle β cannot be adjusted, thus the grating may be arranged such that a phase difference between the phase at bars of the grating and the phase at slits of the grating is odd times of a half-wavelength, so that a destructive interference is generated in the 0-order diffracted wave, and an aim of weakening the 0-order diffracted wave can be achieved. Additionally, diffracted waves having orders equal to or larger than ±2 are not objects to be adjusted in the embodiment of the present disclosure, because their diffractive angle β are too large such that their light intensities are relatively low. In summary, the diffracted waves to be adjusted in the embodiment of the present disclosure are ±1-order diffracted waves.

In another embodiment, the phase plate 102 is a multi-order grating shown in FIG. 4b. The larger the number of steps of a single phase stage 1021 is, the higher the light extraction efficiency of ±1-order diffracted wave is, and the larger the energy of centrally emitted light is. When the number of steps of the phase stage 1021 is less than 4, the effect of increasing light extraction efficiency of ±1-order diffracted wave is not significant, and when the number of steps of the phase stage 1021 is more than 8, although it can increase light extraction efficiency of ±1-order diffracted wave, manufacturing accuracy needs to be improved, which goes against controlling production cost. Therefore, the number of steps of a single phase stage is preferably in a range of 4 to 8, and FIG. 4b shows an embodiment wherein each phase stage has 4 steps, which can facilitate controlling production cost and increasing light extraction efficiency of ±1-order diffracted wave, so as to improve display performance of holographic display.

In summary, by adjusting the period of the phase plate 102, a diffractive angle β of light passing through the phase plate 102 can be adjusted, such that the position (i.e., image plane position, for example, image plane position DF1) of an intersection point of reverse extension lines of light emitted from the same display unit 10 can be adjusted, and thereby a distance between the image plane position and a user's eyes can be changed. A spatial position of a holographically displayed image may be defined by the image plane position, such that an image reproduced by the holographic display panel may have a certain stereoscopic effect.

When the holographic display panel has a plurality of display units 10 having image plane positions different from each other, the performance of stereoscopic display would be better. A detailed description of a holographic display panel having such a structure is provided hereinafter.

Specifically, as shown in FIG. 2, the plurality of display units 10 in the holographic display panel are divided into a plurality of display groups 01 arranged into an array, each display group 01 is consisted of at least two display units 10, and the at least two display units 10 are arranged adjacent to each other. Image plane positions of display units 10 in a same display group 01 are different from each other. For example, when one display group 01 is consisted of two display units 10 having different image plane positions, an image plane position of one of the two display units 10 is DF1, and an image plane position of the other display unit 10' arranged in the same display group 01 as the one display unit 10 is DF2.

As shown in FIG. 2, an image reproduced at the image plane position DF1 is relatively closer to a user's eyes. Assuming that, in this condition, a distance between the image plane position DF1 and the user's eyes is 18 cm to 22 cm, so that it is ensured that the user's eye can clearly see the image which is relatively closer to the user's eyes. An image reproduced at the image plane position DF2 is relatively farther away from the user's eyes, and assuming that, in this condition, a distance between the image plane position DF2 and the user's eyes is 280 cm to 320 cm, such that it is ensured that the user's eyes can clearly see the image which is relatively farther away from the user's eyes.

In the embodiment shown in FIG. 2, each display group 01 is consisted of two display units 10, an image plane position of one display unit 10 of the two display units is DF1, an image plane position of the other display unit 10' of the two display units is DF2; further, each display unit 10 includes two adjacent pixels 101. An Example will be described in detail in conjunction with the embodiment shown in FIG. 2.

When the image reproduced by the holographic display panel needs to have the image plane position DF1, both of the two pixels 101 of the display unit 10 having the image plane position DF1 are turned on, and both of the two pixels 101 of the display unit 10' having the image plane position DF2 are turned off, such that, in the holographic display panel, only the display unit 10 having the image plane position DF1 can emit light, and therefore the image reproduced by the holographic display panel has the image plane position DF1.

When the image reproduced by the holographic display panel needs to have the image plane position DF2, both of the two pixels 101 of the display unit 10' having the image plane position DF2 are turned on, and both of the two pixels 101 of the display unit 10 having the image plane position DF1 are turned off, such that, in the holographic display panel, only the display unit 10' having the image plane position DF2 can emit light, and therefore the image reproduced by the holographic display panel has the image plane position DF2.

When the image reproduced by the holographic display panel needs to have the image plane position DF1 and the image plane position DF2, the two pixels 101 of the display unit 10 having the image plane position DF1 and the two pixels 101 of the display unit 10' having the image plane position DF2 are turned on, such that, in the holographic display panel, both of the display unit 10 having the image plane position DF1 and the display unit 10' having the image plane position DF2 can emit light, and therefore the image reproduced by the holographic display panel has the image plane position DF1 and the image plane position DF2.

When the image reproduced by the holographic display panel needs to have an image plane position DF3 located between the image plane position DF1 and the image plane position DF2 (as shown in FIG. 2), it can be achieved by the following manner.

Figure 7:
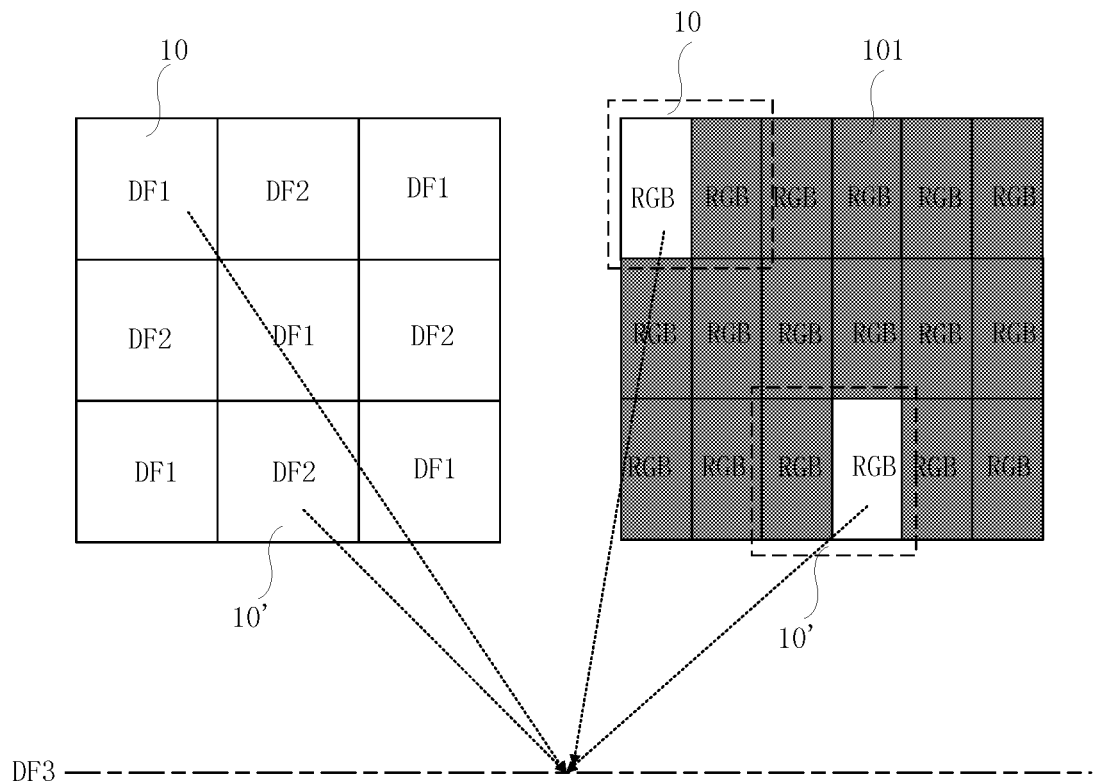
FIG. 7 is an illustrative drawing, showing a principle of realizing setting of the image plane position by combining pixels of two different display units.

FIG. 7 shows an arrangement of display units (see the left drawing of FIG. 7), and each display unit includes two pixels 101 (see the right drawing of FIG. 7). FIG. 7 shows two different display units 10, 10', which have the first image plane position DF1 and the second image plane position DF2 respectively. As shown in the right drawing of FIG. 7, one pixel 101 of the display unit 10 having the image plane position DF1 is turned on (the pixel 101 which is turned on has no color), the other pixel 101 is turned off, and one pixel 101 of the display unit 10' having the image plane position DF2 is turned on and the other pixel 101 is turned off. Further referring to FIG. 2, the upper pixel of the display unit 10 having the image plane position DF1 is turned on and the lower pixel of the display unit 10 having the image plane position DF1 is turned off, and the lower pixel of the display unit 10' having the image plane position DF2 is turned on and the upper pixel of the display unit 10' having the image plane position DF2 is turned off. A reverse extension line of light emitted from the upper pixel 101 of the display unit 10 that is turned on and a reverse extension line of light emitted from the lower pixel 101 of the display unit 10' that is turned on intersect at the image plane position DF3 between the image plane position DF1 and the image plane position DF2, after passing through respective phase plates 102, such that the image reproduced by the holographic display panel has the image plane position DF3. Adjustment of other image plane positions between the image plane position DF1 and the image plane position DF2 is similar to the above-described manner and will not be repeated herein. Obviously, the image plane position DF3 can be obtained by combining two pixels located in different display units 10.

Figure 8:
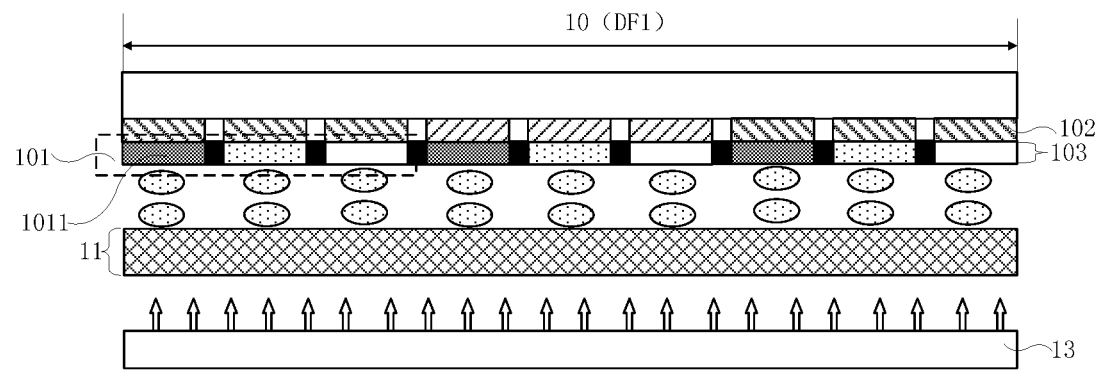
FIG. 8 is an illustrative drawing showing a holographic display device according to still another embodiment of the present disclosure.

In the case that each display unit 10 includes three pixels 101 and the phase plate 102 is arranged at the side of the color filter layer 103 facing away from the color filter layer 103, as shown in FIG. 8, light emitted from the backlight source 13 first passes through the color filter layer 103 and then arrives at the phase plate 102 (for example, the phase plate 102 is a transmission grating). With the light filtering function of the color filter layer 103, light of different colors irradiates to different phase plates 102. For example, in the case that the pixel 101 includes a red sub-pixel, a green sub-pixel and a blue sub-pixel, the pixel 101 can emit red light, green light and blue light. Since red light, green light and blue light have different wavelengths λ, light arrives at the phase plate 102 has different wavelengths λ. In order to make light emitted by three sub-pixels 1011 of the same one pixel 101 (for example, the left pixel 101) to have the same diffractive angle β after passing through respective phase plates 102, periods P of three phase plates 102 corresponding to the three sub-pixels 1011 need to be changed, such that periods P of the three phase plate 102 are different from each other. For example, since the wavelength λ of the red light is larger than those of the green light and the blue light, the period P of the phase plate 102 corresponding to the red sub-pixel needs to be enlarged while periods of the phase plates 102 corresponding to the blue sub-pixel needs to be reduced, when a diffractive angle β of the green light after passing through the phase plate 102 is used as a reference. Therefore, periods P of phase plates 102 in the same display unit 10 shown in FIG. 8 are different from each other.

Figure 9:
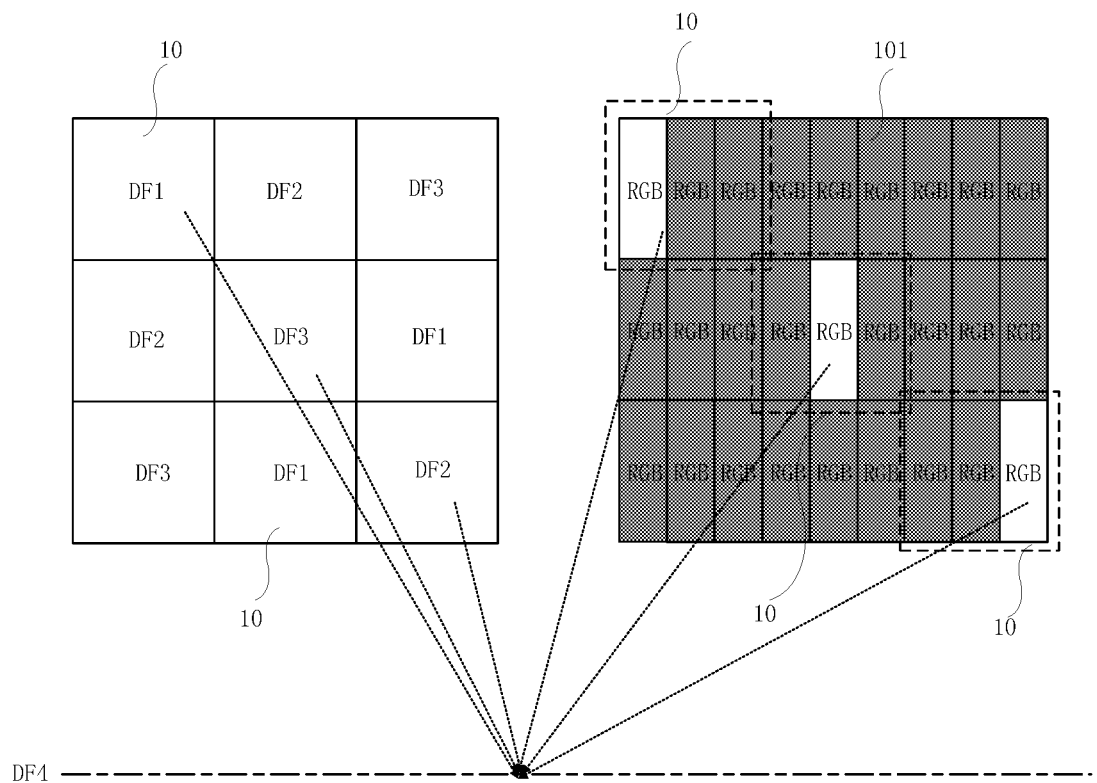
FIG. 9 is an illustrative drawing, showing a principle of realizing setting of the image plane position by combining pixels of three different display units.

In another embodiment shown in FIG. 9, the display group 01 may include three different display units 10, each of which has three different image plane positions, i.e., an image plane position DF1, an image plane position DF2 and an image plane position DF3. In this case, as shown in FIG. 9, one pixel 101 of each of the three display units 10 are turned on (the pixel 101 that is turned on is not applied with any color), such that diffractive angles β of outcoming light emitted by pixels 101, which are turned on, are different from each other after passing through respective phase plates 102, and thereby, reverse extension lines of the outcoming light having the above three different diffractive angles β intersect at an image plane position DF4. As a conclusion, the image plane position DF4 can be obtained through a combined use of the pixels 101 located in the three different display units 10. Further, the above embodiment is described as an example, in which the image plane position DF4 is determined by the intersection point of the reverse extension lines of the pixels 101 in three different display units 10, and of course, light emitted from every two of the three pixels 101 in the three display units 10 may also intersect at different points, such that image plane positions other than the image plane position DF1, the image plane position DF2 and the image plane position DF3 can be determined, which is in favor of diversity of adjustment of the image plane positions.

To be noted, when a display group 01 is consisted of more than three different display units 10 having different image plane positions, adjustment of image plane positions is similar to that described above and will not be repeated herein.

In order to combine a pixel 101 of one display unit 10 with a pixel 101 of any display unit 10 adjacent to the one display unit 10, preferably, as shown in FIG. 7 or 9, one display unit 10 has an image plane position different from that of any display unit 10 adjacent to the one display unit 10.

As a conclusion, since image plane positions of display units 10 in the same display group 01 are different from each other, when ON or OFF states of the display units 10 of the display units 10 in the same display group 01 are controlled, a plurality of image plane positions for holographic display can be defined by the same one display group 01, such that the stereoscopic effect of a dynamic holographic display can be improved.

The following is an example used to describe an arrangement of sub-pixels 1011 forming the above described pixel 101.

Figure 10:
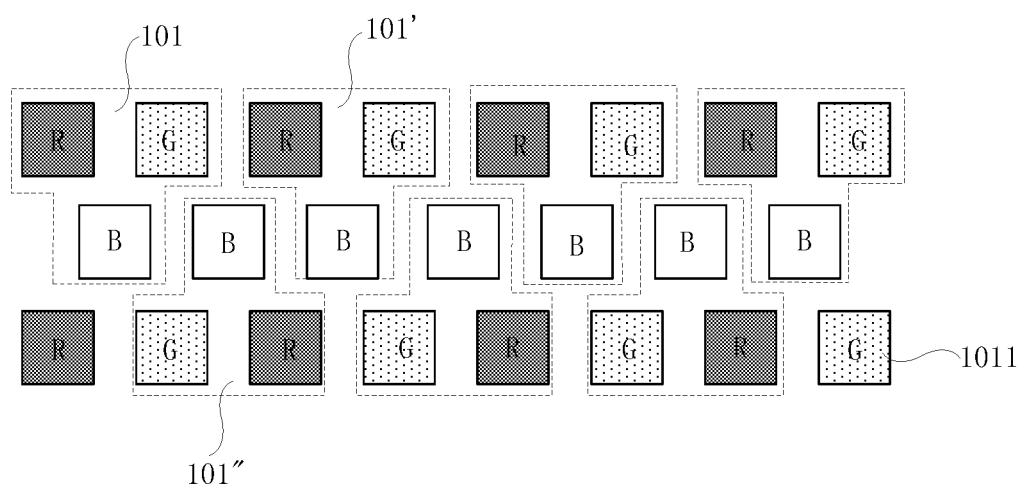
FIG. 10 is an illustrative drawing showing an arrangement of sub-pixels according to an embodiment of the present disclosure.

In one embodiment, in the case that a plurality of sub-pixels 1011 forming the pixel 101 includes first sub-pixels (for example, red sub-pixels R), second sub-pixels (for example, green sub-pixels G) and third sub-pixels (for example, blue sub-pixels B), as shown in FIG. 10, in one row of two adjacent sub-pixel rows, the first sub-pixels R and the second sub-pixels G are arranged alternately, while in the other row of the two adjacent sub-pixel rows, there are only the third sub-pixels B. additionally, three sub-pixels of each pixel 101 is arranged in a triangle arrangement, as shown in FIG. 10.

In this case, when each display unit 10 includes two adjacent pixels, as shown in FIG. 10, the two adjacent pixels may be a pixel 101 and a pixel 101' adjacent to one another in a same horizontal direction, or they may be the pixel 101 and a pixel 101" adjacent to one another in different horizontal directions. Further, when each display unit 10 includes three adjacent pixels, as shown in FIG. 10, the three adjacent pixels may include the pixel 101 and the pixel 101' that are adjacent to one another in a same horizontal direction, and the pixel 101" adjacent to the pixel 101 and the pixel 101' in a different horizontal direction. Of course, the above embodiment is just an illustration taking each display unit 10 including two or three adjacent pixels 101 as an example, and in the case that one display unit 10 includes a different number of pixels 101, the display unit 10 may be divided similarly as above, which will not be repeatedly described herein.

In another embodiment, a plurality of sub-pixels 1011 forming the pixel 101 may be arranged in order. Specifically, in a case where the sub-pixels 1011 include first sub-pixels (for example, red sub-pixels R), second sub-pixels (for example, green sub-pixels G) and third sub-pixels (for example, blue sub-pixels B), as shown in FIG. 11, the first sub-pixels R, the second sub-pixels G and the third sub-pixels B are arranged in order.

Figure 11:
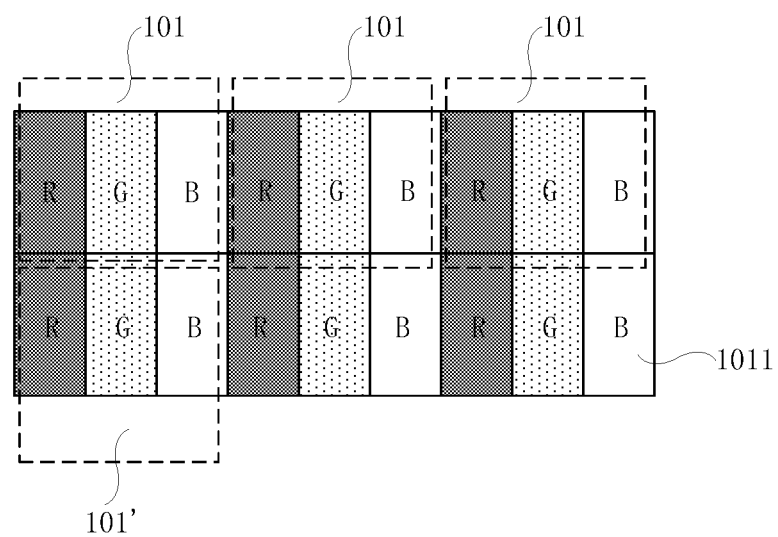
FIG. 11 is an illustrative drawing showing an arrangement of sub-pixels according to another embodiment of the present disclosure.

In this case, when each display unit 10 includes two adjacent pixels, as shown in FIG. 11, the two adjacent pixels may be a pixel 101 and a pixel 101 adjacent to one another in a same horizontal direction, or they may be the pixel 101 and a pixel 101' adjacent to one another in different horizontal directions. Further, when each display unit 10 includes three adjacent pixels, as shown in FIG. 10, the three adjacent pixels may include three pixels 101 arranged in order in a same horizontal direction, or it may include two pixels 101 adjacent to one another in a same horizontal direction and the pixel 101' adjacent to the pixels 101 in a different horizontal direction. Of course, the above embodiment is just an illustration taking each display unit 10 including two or three adjacent pixels 101 as an example, in the case that one display unit 10 includes a different number of pixels 101, the display unit 10 may be divided similarly as above, which will not be repeatedly described herein.

An embodiment of the present disclosure provides a holographic display device, which includes the holographic display panel according to any one of the above described embodiment, such that the display device has a similar structure and the same beneficial effect as the holographic display panel provided in previous embodiment. Since the structure and beneficial effect of the holographic display panel have been described in detail in the above embodiments, they will not be repeated herein.

Figure 12:
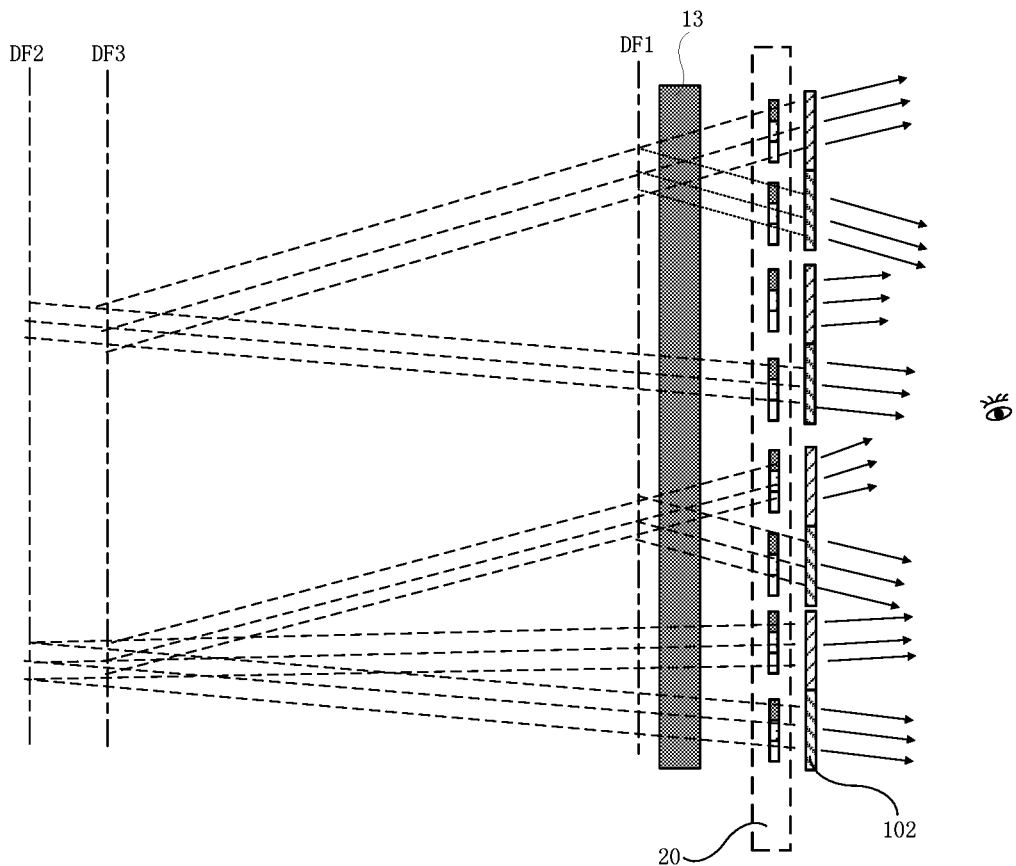
FIG. 12 is an illustrative drawing showing a principle of achieving a holographic display of a holographic display device according to another embodiment of the present disclosure.

On this basis, the holographic display panel may include an organic light emitting diode display panel or a liquid crystal display panel. In the case that the holographic display panel includes a liquid crystal display panel, the holographic display device further include a backlight source 13, as shown in FIG. 12, which is configured to provide backlight to the liquid crystal display panel and to provide the reference light when the holographic display panel is reproducing a holographic image. The present disclosure is not limited by the type of the backlight source 13, which may be of a direct type or an edge type in structure, and may be a surface light source or a light source array. Additionally, when performing a hologram calculation, characteristics of the reference light provided by the backlight source 13 need to be considered. Since characteristics of a collimated light are relatively simple, when the backlight source 13 is a direct backlight source, preferably, the backlight source 13 is a collimated light source, so as to reduce difficulty in the hologram calculation.

In such a manner, before display, coded information of a holographic image obtained through hologram calculation may be converted into voltage data applied to respective sub-pixels of the pixel. When the holographic image changes, the coded information changes accordingly, such that voltage data applied to respective sub-pixels in the liquid crystal display panel 20 shown in FIG. 12 also varies, and thereby a dynamic holographic display can be achieved. Moreover, when the holographic display panel is used to perform a holographic display, the backlight source 13 can provided the reference light for the reproduction of the holographic image, and the reference light can be irradiated to the phase plate 102 through the liquid crystal display panel 20. By adjusting the phase plate 102, diffractive angle β of outcoming light from the phase plate can be controlled, such that reverse extension lines of light emitted from the same display group 10 intersect at a same image plane position. For example, reverse extension lines of light emitted from the display group 10 having the image plane position DF1 intersect at the image plane position DF1, and reverse extension lines of light emitted from the display group 10 having the image plane position DF2 intersect at the image plane position DF2. Therefore, a spatial location of a holographically displayed image may be defined by the image plane positions. On this basis, since image plane positions of respective display units in the same display group are different from each other, a plurality of spatial locations of a holographically displayed image can be defined by the same display group through controlling the ON and OFF states of pixels in respective display units of the same display group, such that the stereoscopic effect of the dynamic holographic display can be improved.

Figure 13:
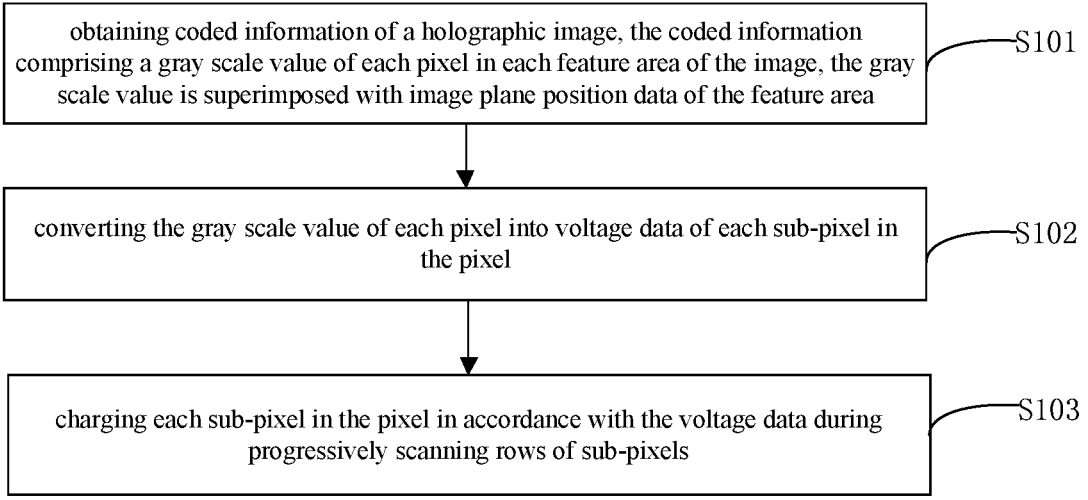
FIG. 13 is a flowchart of a display method of a holographic display device according to an embodiment of the present disclosure.

In another aspect, the present disclosure also provides a display method that can be applied to the holographic display device according to any one of the above described embodiments. As shown in FIG. 13, the method includes:

S101: obtaining coded information of a holographic image, the coded information including: gray scale value of each pixel 101 in each feature area of the image, wherein the gray scale value is superimposed with image plane position data of the feature area, and additionally, the image plane position data of one feature area indicates only one image plane position.

To be noted, the coded information of the holographic image is obtained through a hologram calculation. Hologram calculation means calculating a holographic image by using a computer. The hologram calculation does not need substantial existence of an object, the holographic image can be drawn after inputting a mathematical description of an object wave into the computer, and then the holographic image can be reproduced by an optical means.

Specifically, drawing a holographic image by hologram calculation includes the following steps:

first, obtaining values of an object or a wave surface at discrete sampling points by sampling;

then, calculating light distribution of the object light wave in a holographic plane;

then, encoding, i.e., encoding complex amplitude distribution of the light wave in the holographic plane into transmissivity variations of the holographic image;

finally, forming an image, specifically, drawing an image with the transmissivity variations of the holographic image under control of a computer. While drawing the image with the transmissivity variations of the holographic image, gray scale values of respective sub-pixels of the image that is drawn are determined.

Moreover, the above mentioned feature area means that an effective display region of the display panel for displaying the whole image is divided according to features of the image to be displayed, and the feature area is an area having a closed boundary, and one feature area has only one image plane position.

For example, a holographic image to be reproduced includes the following features: a person located nearby, a mountain far away, and water between the person and the mountain. In this case, the effective display region may be divided into a first feature area where the person is located, a second feature area where the mountain is located, and a third feature area where the water is located. Image plane positions indicated by image plane position data of the first feature area, second feature area and third feature area are different from each other. For example, the image plane positions indicated by image plane position data of the first feature area is the image plane position DF1 shown in FIG. 2, the image plane positions indicated by image plane position data of the second feature area is the image plane position DF2, the image plane positions indicated by image plane position data of the third feature area is the image plane position DF3. A distance between the image plane position DF1 and the user's eyes is the shortest, a distance between the image plane position DF2 and the user's eyes is the longest, and a distance between the image plane position DF3 and the user's eyes is intermediate.

Assuming that the display group 01 consists of two display units 10, an image plane position of one display units 10 is DF1, an image plane position of the other display unit 10' is DF2, and each display unit 10 includes two adjacent pixels 101. A method of superimposing an image plane position of a feature area to obtain the gray scale value of each pixel 101 in the feature area will be described hereinafter.

For example, for the first feature area where the feature person is located, the image plane positions indicated by the image plane position data of the first feature area is the image plane position DF1, therefore, in the first feature area, both pixels 101 in the display unit 10 shown in FIG. 2, which has the image plane position DF1, are turned on, and both pixels 101 in the display unit 10', which has the image plane position DF2, are turned off, such that at a position in the holographic display panel corresponding to the first feature area, only the display unit 10 having the image plane position DF1 can emit light, thus, gray scale values of the pixels 101 of the display unit 10, which has the image plane position DF1, are superimposed with the image plane position data, such that an image reproduced at the position of the holographic display panel corresponding to the first feature area has the image plane position DF1 indicated by the image plane position data.

Further, for the second feature area where the feature mountain is located, the image plane positions indicated by the image plane position data of the second feature area is the image plane position DF2, therefore, in the second feature area, both pixels 101 in the display unit 10' shown in FIG. 2, which has the image plane position DF2, are turned on, and both pixels 101 in the display unit 10, which has the image plane position DF1, are turned off, such that at a position in the holographic display panel corresponding to the second feature area, only the display unit 10' having the image plane position DF2 can emit light, thus, gray scale values of the pixels 101 of the display unit 10', which has the image plane position DF2, are superimposed with the image plane position data, such that an image reproduced at the position of the holographic display panel corresponding to the second feature area has the image plane position DF2 indicated by the image plane position data.

Additionally, when the image plane position indicated by the image plane position data of the feature area is different from the image plane position of any display unit 10, the method of superimposing an image plane position of a feature area to obtain the gray scale value of each pixel 101 in the feature area includes selecting and turning on one pixel 101 of each display unit of at least two display units 10, such that reverse extension lines of the light outcoming from the phase plates 102 corresponding to the pixels 101 that are turned on intersect at an image plane position indicated by the image plane position data of the feature area.

Specifically, for the third feature area where the feature water is located, the image plane positions indicated by the image plane position data of the third feature area is the image plane position DF3, but the display group 01 only include the display unit 10 having the image plane position DF1 and the display unit 10' having the image plane position DF2. Therefore, the image plane position indicated by the image plane position data of the third feature area is different from the image plane position of any one of the display units 10. In this case, since the image plane position DF3 is located between the image plane position DF1 and the image plane position DF2, as shown in FIG. 7, one of the pixels 101 of the display unit 10 having the image plane position DF1 is turned on and the other one of the pixels 101 is turned off, and one of the pixels 101 of the display unit 10' having the image plane position DF2 is turned on and the other one of the pixels 101 is turned off, such that gray scale values of the pixels 101 of the display unit 10 having the image plane position DF1 and the pixels 101 of the display unit 10' having the image plane position DF2 are superimposed with the image plane position data.

In this circumstance, as shown in FIG. 2, a reverse extension line of the light emitted by the pixel 101, which is turned on, of the display unit 10 having the image plane position DF1 and a reverse extension line of the light emitted by the pixel 101, which is turned on, of the display unit 10' having the image plane position DF2 intersect at the image plane position DF3 after passing through respective phase plates 102 corresponding to the pixels that are turned on, such that an image reproduced at the position of the holographic display panel corresponding to the third feature area has the image plane position DF3 indicated by the image plane position data.

Adjustment of other image plane positions located between the image plane position DF1 and the image plane position DF2 are similar to the manner described above, and will not be repeated herein.

The method further comprises:

S102: converting the gray scale value of each pixel 101 into voltage data Vdata of each sub-pixel 1011 in the pixel 101; and S103: charging each sub-pixel 1011 in the pixel 101 in accordance with the voltage data Vdata during progressively scanning rows of sub-pixels 1011.

During performing the step 103, as shown in FIG. 12, the backlight source 13 may provide reference light, and the liquid crystal display panel 20 can control color and gray scale of each sub-pixel 1011, such that the image reproduced by the liquid crystal display panel 20 matches the holographic image drawn in the step S101, and thereby a reproduction process of the holographic display is achieved.

In such a manner, the coded information of the holographic image obtained through a hologram calculation can be converted into voltage data of each sub-pixel in the pixel. In this case, when the holographic image changes, the coded information changes accordingly, such that the voltage data of each sub-pixel also changes, and thereby a dynamic holographic display can be achieved.

As shown in FIG. 3, each display unit 10 of the holographic display panel further comprises a plurality of phase plates 102, and these phase plates 102 may be used to adjust diffractive angles β of light coming out of the phase plates 102, so as to adjust a distance between an image plane position (image plane position DF1), which is an intersection point of reverse extension lines of light emitted from the same one display unit 10, and human's eyes, such that the image reproduced by the holographic display panel has a certain stereoscopic effect. When the holographic display panel has a display unit 10 having a plurality of different image plane positions, an even better stereoscopic effect can be achieved.

Although several exemplary embodiments have been shown and described in combination with the drawings, it would be appreciated by those skilled in the art that various changes or modifications may be made in these embodiments without departing from the principles and spirit of the disclosure, the scope of which is defined in the claims and their equivalents.

What is claimed is:

1. A holographic display panel, comprising a plurality of display units, each of the plurality of display units comprising:
    at least two adjacent pixels each comprising a plurality of sub-pixels; and
    a plurality of phase plates, each sub-pixel of the plurality of sub-pixels corresponding to one of the plurality of phase plates in a light exit direction of the sub-pixel, the plurality of phase plates being configured to control diffractive angles of light coming out of the plurality of phase plates,
    wherein diffractive angles of light coming out of the phase plates corresponding to the sub-pixels in one same pixel are the same, and a diffractive angle of first light coming out of the phase plates corresponding to a first pixel in one of the plurality of display units is different from a diffractive angle of second light coming out of the phase plates corresponding to a second pixel that is different from the first pixel and is in the same display unit as the first pixel, and a reverse extension line of the first light and a reverse extension line of the second light intersect at an image plane position;
    wherein the holographic display panel further comprises an array substrate and a color filter substrate disposed opposite to the array substrate; wherein the color filter substrate comprises a color filter layer and the plurality of phase plates, and the plurality of phase plates are disposed at a side of the color filter layer facing away from the array substrate; and wherein the plurality of display units are divided into a plurality of display groups arranged into an array, each of the plurality of display groups includes at least two display units, and the at least two display units are located adjacent to each other, and wherein image plane positions of the display units in a same one of the plurality of display groups are different from each other.

2. The holographic display panel according to claim 1, wherein a first display unit of the plurality of display units has an image plane position different from an image plane position of any one of the display units adjacent to the first display unit.

3. The holographic display panel according to claim 1, wherein each pixel comprises a first sub-pixel, a second sub-pixel and a third sub-pixel; the first sub-pixels, the second sub-pixels and the third sub-pixels in the holographic display panel are arranged in two adjacent rows, and wherein the first sub-pixels and the second sub-pixels are arranged alternately in a first row of the two adjacent rows, and a second row of the two adjacent rows is constituted only by the third sub-pixels; and the third sub-pixel of each pixel is located between the first sub-pixel and the second sub-pixel of the same pixel in a direction of the rows.

4. The holographic display panel according to claim 1, wherein the plurality of sub-pixels of each pixel are arranged in a same row.

5. The holographic display panel according to claim 1, wherein the plurality of phase plates are transmission gratings.

6. A holographic display device, comprising the holographic display panel according to claim 1.

7. The holographic display device according to claim 6, wherein the holographic display panel comprises a liquid crystal display panel and a collimated backlight source configured to provide backlight to the liquid crystal display panel.

8. A holographic display method for the holographic display device according to claim 6, wherein the method comprises:

obtaining coded information of a holographic image, the coded information comprising a gray scale value of each pixel in each feature area of the image, wherein the gray scale value is superimposed with image plane position data of the feature area, and the image plane position data of one feature area indicates only one image plane position;

converting the gray scale value of each pixel into voltage data of each sub-pixel in the pixel; and charging each sub-pixel in the pixel in accordance with the voltage data during progressively scanning rows of sub-pixels.

9. The method according to claim 8, wherein the plurality of display units are divided into a plurality of display groups arranged into an array, each of the plurality of display groups includes at least two display units having different image plane positions, each of the plurality of display units comprising at least two adjacent pixels, an image plane position indicated by image plane position data of the feature area is different from an image plane position of any of the plurality of display units, and the method of superimposing an image plane position of the feature area to obtain the gray scale value of each pixel in the feature area comprises:

selecting and turning on one pixel of each display unit of the at least two different display units, wherein reverse extension lines of light coming out of the phase plates corresponding to the pixels that are turned on intersect at an image plane position indicated by the image plane position data of the feature area.

10. The holographic display method for the holographic display device according to claim 8, wherein the method comprises:

obtaining coded information of a holographic image, the coded information comprising a gray scale value of each pixel in each feature area of the image, wherein the gray scale value is superimposed with image plane position data of the feature area, and the image plane position data of one feature area indicates only one image plane position;

converting the gray scale value of each pixel into voltage data of each sub-pixel in the pixel; and charging each sub-pixel in the pixel in accordance with the voltage data during progressively scanning rows of sub-pixels.

11. The method according to claim 10, wherein the plurality of display units are divided into a plurality of display groups arranged into an array, each of the plurality of display groups includes at least two display units having different image plane positions, each of the plurality of display units comprising at least two adjacent pixels, an image plane position indicated by image plane position data of the feature area is different from an image plane position of any of the plurality of display units, and the method of superimposing an image plane position of the feature area to obtain the gray scale value of each pixel in the feature area comprises:

selecting and turning on one pixel of each display unit of the at least two different display units, wherein reverse extension lines of light coming out of the phase plates corresponding to the pixels that are turned on intersect at an image plane position indicated by the image plane position data of the feature area.

12. The holographic display device according to claim 6, wherein the plurality of display units are divided into a plurality of display groups arranged into an array, each of the plurality of display groups includes at least two display units, and the at least two display units are located adjacent to each other; and wherein image plane positions of the display units in a same one of the plurality of display groups are different from each other.

13. The holographic display device according to claim 12, wherein a first display unit of the plurality of display units has an image plane position different from an image plane position of any one of the display units adjacent to the first display unit.

14. The holographic display device according to claim 6, wherein each pixel comprises a first sub-pixel, a second sub-pixel and a third sub-pixel; the first sub-pixels, the second sub-pixels and the third sub-pixels in the holographic display panel are arranged in two adjacent rows, and wherein the first sub-pixels and the second sub-pixels are arranged alternately in a first row of the two adjacent rows, and a second row of the two adjacent rows is constituted only by the third sub-pixels; and the third sub-pixel of each pixel is located between the first sub-pixel and the second sub-pixel of the same pixel in a direction of the row.

15. The holographic display device according to claim 6, wherein the plurality of sub-pixels of each pixel are arranged in a same row.

16. The holographic display device according to claim 6, wherein the plurality of phase plates are transmission gratings.

* * * * *